US008930711B2

(12) United States Patent
Asnaashari et al.

(10) Patent No.: US 8,930,711 B2
(45) Date of Patent: *Jan. 6, 2015

(54) CRITICAL SECURITY PARAMETER GENERATION AND EXCHANGE SYSTEM AND METHOD FOR SMART-CARD MEMORY MODULES

(75) Inventors: Mehdi Asnaashari, Danville, CA (US); Ruchirkumar D. Shah, San Jose, CA (US); Sylvain Prevost, Austin, TX (US); Ksheerabdhi Krishna, Cedar Park, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,613

(22) Filed: Apr. 2, 2012

(65) Prior Publication Data

US 2012/0191975 A1  Jul. 26, 2012

Related U.S. Application Data (63) Continuation of application No. 11/938,739, filed on Nov. 12, 2007, now Pat. No. 8,156,322.

(51) Int. Cl.
| | | |
|---|---|---|
| *G06F 21/00* | (2013.01) | |
| *H04L 29/06* | (2006.01) | |
| *G06Q 20/34* | (2012.01) | |
| *G06F 21/77* | (2013.01) | |
| *G06F 21/79* | (2013.01) | |
| *H04W 12/10* | (2009.01) | |
| *G06F 12/14* | (2006.01) | |
| *G06F 21/34* | (2013.01) | |

(52) U.S. Cl.
CPC .............. *G06Q 20/3563* (2013.01); *G06F 21/34* (2013.01); *G06F 21/77* (2013.01); *G06F 21/79* (2013.01)
USPC ........... 713/189; 713/150; 713/165; 713/172; 713/184; 713/194; 726/27; 380/28; 235/380

(58) Field of Classification Search
CPC .......... G06F 21/77; G06F 21/34; G06F 21/79
USPC ................. 713/189, 150, 165, 172, 184, 194; 726/27; 235/380; 380/28
See application file for complete search history.

(56) References Cited

U.S. PATENT DOCUMENTS

| 5,623,637 A | 4/1997 | Jones et al. |
|---|---|---|
| 5,901,311 A | 5/1999 | Labatte et al. |

(Continued)

FOREIGN PATENT DOCUMENTS

| EP | 1 549 020 A2 | 6/2005 |
|---|---|---|
| EP | 1577780 A1 | 9/2005 |

(Continued)

OTHER PUBLICATIONS

Hsin-Jung Yang, Victor Costan, Nickolai Zeldovich, Srinivas Devadas; "Authenticated storage using small trusted hardware"; Nov. 2013; CCSW '13: Proceedings of the 2013 ACM workshop on Cloud computing security workshop; Publisher: ACM; pp. 35-46.*

(Continued)

*Primary Examiner* — Andrew Nalven
*Assistant Examiner* — Courtney Fields
(74) *Attorney, Agent, or Firm* — Dorsey & Whitney LLP (57) ABSTRACT

A storage device contains a smart-card device and a memory device, which is connected to a controller. The storage device may be used in the same manner as a conventional smart-card device, or it may be used to store a relatively large amount of data. The memory device may also be used to store data or instructions for use by the smart-card device. The controller includes a security engine that uses critical security parameters stored in, and received from, the smart-card device. The critical security parameters may be sent to the controller in a manner that protects them from being discovered. The critical security parameters may be encryption and/or decryption keys that may encrypt data written to the memory device and/or decrypt data read from the memory device, respectively. Data and instructions used by the smart-card device may therefore stored in the memory device in encrypted form.

20 Claims, 3 Drawing Sheets

(56) References Cited

U.S. PATENT DOCUMENTS

| | | |
|---|---|---|
| 6,330,653 B1 | 12/2001 | Murray et al. |
| 7,162,645 B2 | 1/2007 | Iguchi et al. |
| 7,370,166 B1 | 5/2008 | Ramesh et al. |
| 7,953,985 B2 | 5/2011 | Nishimura et al. |
| 8,162,227 B2 | 4/2012 | Asnaashari et al. |
| 8,286,883 B2 | 10/2012 | Asnaashari et al. |
| 8,504,849 B2 * | 8/2013 | Jogand-Coulomb et al. .. 713/194 |
| 2001/0041593 A1 | 11/2001 | Asada |
| 2003/0154355 A1 | 8/2003 | Fernandez |
| 2004/0059916 A1 | 3/2004 | Mizushima et al. |
| 2004/0088562 A1 | 5/2004 | Vassilev et al. |
| 2004/0103288 A1 | 5/2004 | Ziv et al. |
| 2004/0143730 A1 | 7/2004 | Wen et al. |
| 2004/0149827 A1 | 8/2004 | Zuili |
| 2004/0232247 A1 | 11/2004 | Tsunoda et al. |
| 2004/0255145 A1 | 12/2004 | Chow |
| 2005/0035200 A1 | 2/2005 | Hendrick |
| 2005/0045717 A1 | 3/2005 | Rager et al. |
| 2005/0086471 A1 * | 4/2005 | Spencer .................. 713/165 |
| 2005/0279826 A1 * | 12/2005 | Merrien .................. 235/380 |
| 2006/0043202 A1 | 3/2006 | Kim et al. |
| 2006/0117190 A1 | 6/2006 | Morita |
| 2006/0126422 A1 | 6/2006 | Takagi et al. |
| 2006/0138217 A1 | 6/2006 | Connelly et al. |
| 2006/0174352 A1 | 8/2006 | Thibadeau |
| 2006/0184806 A1 | 8/2006 | Luttmann et al. |
| 2006/0198515 A1 * | 9/2006 | Forehand et al. ............ 380/28 |
| 2006/0218331 A1 | 9/2006 | James |
| 2006/0289659 A1 | 12/2006 | Mizushima |
| 2007/0002612 A1 | 1/2007 | Chang et al. |
| 2007/0043667 A1 | 2/2007 | Qawami et al. |
| 2007/0101418 A1 | 5/2007 | Wood et al. |
| 2007/0113097 A1 | 5/2007 | Wang |
| 2007/0214369 A1 | 9/2007 | Roberts et al. |
| 2007/0228154 A1 | 10/2007 | Tran |
| 2007/0272752 A1 | 11/2007 | Nakatsugawa et al. |
| 2008/0052532 A1 | 2/2008 | Akkar et al. |
| 2008/0162784 A1 | 7/2008 | Obereiner et al. |
| 2009/0121028 A1 | 5/2009 | Asnaashari et al. |
| 2009/0121029 A1 | 5/2009 | Asnaashari et al. |
| 2009/0254715 A1 | 10/2009 | Jeong |
| 2010/0023747 A1 | 1/2010 | Asnaashari et al. |
| 2010/0229004 A1 | 9/2010 | Asnaashari |
| 2010/0313277 A1 | 12/2010 | Pepin et al. |
| 2012/0204018 A1 | 8/2012 | Asnaashari et al. |
| 2013/0010519 A1 | 1/2013 | Asnaashari et al. |
| 2013/0138972 A1 | 5/2013 | Asnaashari |

FOREIGN PATENT DOCUMENTS

| | | |
|---|---|---|
| EP | 2525595 A1 * | 11/2012 |
| JP | 62-236055 | 10/1987 |
| JP | 08-167013 | 6/1996 |
| JP | 2002-229861 | 8/2002 |
| TW | I234785 | 6/2004 |
| TW | 200623121 | 7/2006 |
| WO | WO-2004/055680 A1 | 7/2004 |
| WO | WO-2006-120938 | 6/2006 |
| WO | 2008/008326 A2 | 1/2008 |
| WO | 2009/064634 A2 | 5/2009 |
| WO | WO-2009/064631 | 5/2009 |

OTHER PUBLICATIONS

Extended European Search Report dated Jul. 19, 2011 for European Patent Application No. 08848669.1, 6 pgs.

International Search Report and Written Opinion dated Apr. 30, 2009 for International Application No. PCT/US2008/082259, 11 pgs.

International Search Report and Written Opinion dated Jun. 12, 2009 for International Application No. PCT/US2008/082274.

International Search Report and Written Opinion dated May 29, 2009 for International Application No. PCT/US2008/082312, 10 pgs.

Wu, et al., "A Low Cost and Inner-Round Pipeline Design of ECB-AES-256 Crypto Engine for Solid State Disk", 2010 Fifth IEEE International Conference on Networking, Architecture, and Storage, p. 485-491.

TW Office Action and Search Report for TW Application No. 097143737 issued May 29, 2012.

First Office Action dated May 30, 2012 for application No. 097143735.

Asnaashari, et al., PCT search report and written opinion for International application No. PCT/US2008/082259, mailed Apr. 30, 2009.

Extended Search Report issued for Appln No. EP 08849194.9 dated Jan. 24, 2013.

https://wiki.archlinux.org/index.php/Master_Boot_Record.

* cited by examiner

CRITICAL SECURITY PARAMETER GENERATION AND EXCHANGE SYSTEM AND METHOD FOR SMART-CARD MEMORY MODULES

This application is a continuation of U.S. patent application Ser. No. 11/938,739, filed Nov. 12, 2007, and issued as U.S. Pat. No. 8,156,322 on Apr. 10, 2012. This application and patent are incorporated herein by reference, in their entirety, for any purpose.

TECHNICAL FIELD

Embodiments of the present invention relate generally to smart-card devices, and, more particularly, to modules containing smart-card devices and memory devices.

BACKGROUND OF THE INVENTION

Chip cards or integrated circuit cards, both of which are commonly known as smart-cards, TPM (trusted platform Module) ICs, or the like, are devices with an embedded integrated circuit, such as a processor and/or limited capacity, non-volatile memory device. The memory device may be an EEPROM (electrically erasable programmable read only memory) or the like, and it may store an operating system for the processor as well as smart-card applications, such as electronic banking applications, telephone applications in the case of SIM (subscriber identity module) smart-cards, or the like. The memory device may also store user authentication protocols, personalization data, such as telephone or bank account data or the like, user data, such as financial data or the like, private data, such as private keys and/or certificates used in various encryption techniques, etc. User data may be secured using a PIN (personal identification number) or a password as an access control measure. In order to access the protected data stored in the card's memory device, a user must be authenticated by providing the correct PIN or password.

Although smart-card integrated devices often contain memory devices, as mentioned above the capacity of such memory devices is often very limited. Therefore, smart-card devices with larger and more costly embedded integrated memory may be needed in order to meet a demand for increased storage capacity for storing additional and/or more complex applications, user data, etc.

Figure 1:
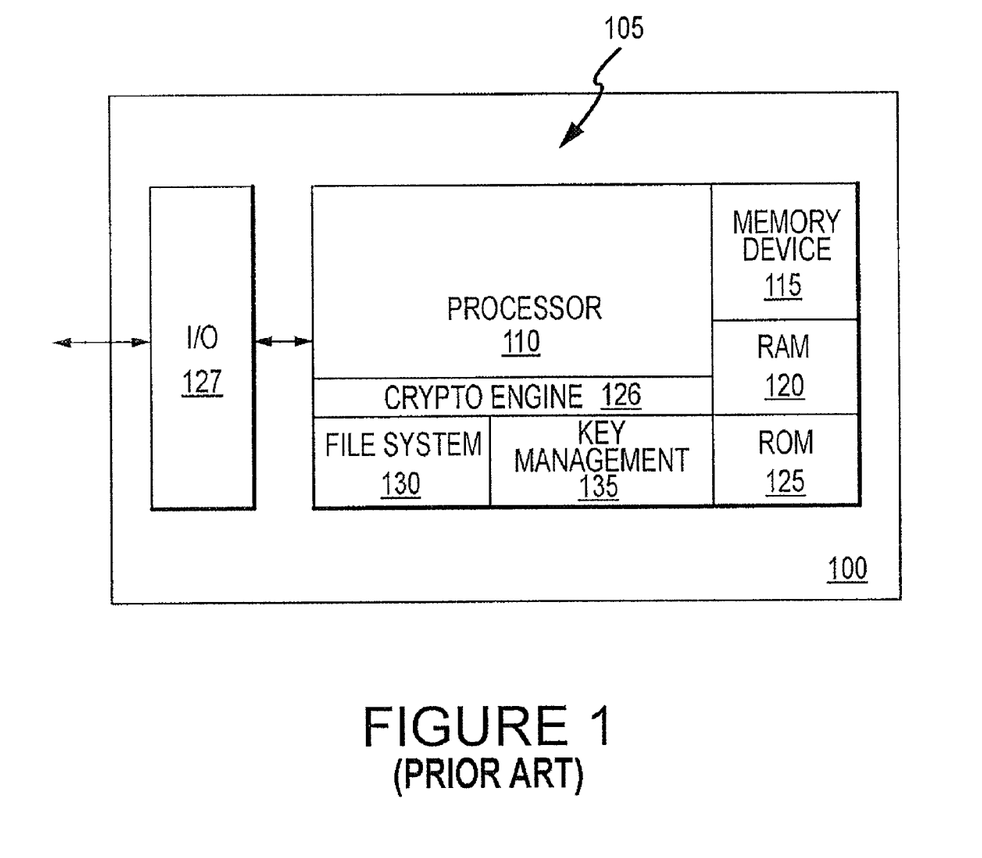
FIG. 1 is a block diagram of one embodiment of a prior art integrated smart-card device.

FIG. 1 is a block diagram illustration of a prior art integrated circuit, such as an integrated smart-card device 100, a SIM card, an electronic transaction card, an electronic identification card, a trusted platform Module ("TPM"), or the like, of the prior art. A central processing unit ("CPU") 105 is embedded in smart-card device 100 and may include a processor 110 and an integrated random access memory ("RAM") 120, a non-volatile memory 115, such as an EEPROM or flash memory, and a read only memory ("ROM") 125. The processor 110 may include a cryptography engine 126, such as an advanced encryption system ("AES") encryption engine, as a portion of access control circuitry of CPU 105, that can perform AES protocols, user authentication protocols, such as Public Key Infrastructure ("PKI") authentication, encryption and decryption of data, etc. An input/output interface 127 is in communication with the CPU 105 and may be a USB (universal serial bus) interface for connecting directly to a host, such as a personal computer, a contactless interface, an ISO 7816 interface for use with an ISO 7816 card reader, etc. The ROM 125 typically stores the operating system of smart-card device 100. The smart-card device 100 may also include a file management system 130 that may be used to manage the address space of the non-volatile memory 115, and a key management system 135 for managing and storing one or more encryption and/or decryption keys, such as one or more AES encryption and/or decryption keys or the like. The non-volatile memory 115 or the key management system 135 may store private keys, certificates that may include public keys as part of public/private key encryption, applications, such as electronic banking applications, telephone applications, etc. The non-volatile memory 115 may further include upgrades or patches for the smart-card operating system.

During operation, the smart-card device 100 is placed in communication with a host via a card reader, for example. An identifier, such as PIN or password, is input into the host by as user. The reader may then pass the user-entered identifier on to the smart-card device 100 for verification so that the smart-card can authenticate the user. The smart-card device 100 then indicates to the host that the user is either authenticated or not authenticated. Alternatively, the smart-card device 100 may be in direct communication with the host via a USB interface, for example. In which case, the identifier is input into the host and is then passed directly to the smart-card device 100 via the USB interface for authentication of the user. After user authentication, the processor 110 either decrypts data from the non-volatile memory 115 for output to the host, or it encrypts data received from the host for storage in the non-volatile memory 115, e.g., using one or more encryption and/or decryption keys, such as AES keys, from the key management system 135.

Although the smart-card device 100 includes the non-volatile memory 115, the capacity of the memory 115 is normally very limited. Therefore, larger and more costly embedded integrated memory may be needed in order to meet a demand for increased storage capacity for storing additional and/or more complex applications, user data, etc. This could be provided by including a separate non-volatile memory device packaged with, and coupled to, the smart-card device 100. However, although it may be relatively easy to protect data stored in the memory 115 of the smart-card device 100, it is substantially more difficult to protect data by encryption or other means if the data are stored in a separate memory device that is packaged with the smart-card. In part, the difficulty of protecting data stored in a separate memory device is due to the fact protection algorithms and the cryptography keys that are normally used by such algorithms reside in the smart-card device 100. It may be possible to obtain access to interconnections between the smart-card device 100 and the memory device, which would allow the interconnections to be probed to obtain the signals coupled between the smart-card device 100 and memory device. A knowledge of these signal can allow a third party to obtain access to the otherwise protected data. Additionally, it may be difficult to protect an external memory against intrusion to the same extend that smart-card devices can and commonly are protected against intrusion and tampering. For example, smart card-devices typically include integrated sensors that protect against physical attacks, such as tampering with the device trying to extract information from it will cause the device to malfunction.

There is therefore a need for a system and method for protecting data stored in an integrated memory device that is packaged with a smart-card device to provide a smart-card having a large capacity of protected data storage.

DETAILED DESCRIPTION

Figure 2:
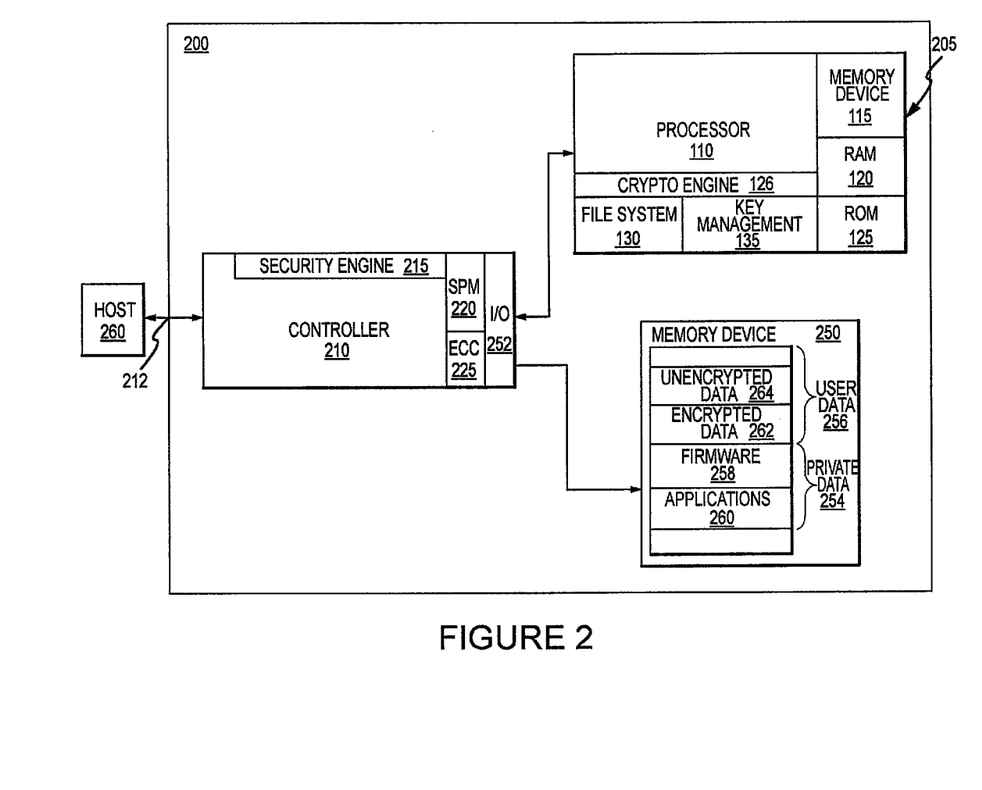
FIG. 2 is a block diagram of a storage device according to an embodiment of the invention in which an integrated smart-card device and a memory device are connected to each other and an access port through a controller.

FIG. 2 is a block diagram illustration of a storage device 200, e.g., a smart storage device, according to an embodiment of the invention. Many of the components used in the storage device 200 are the same or substantially the same as components are used in the smart-card device 100 shown in FIG. 1. Therefore, in the interest of brevity, an explanation of these components will not be repeated, and the same reference numerals will be used in FIG. 2. The storage device 200 may include a smart-card device 205 having components similar to those of smart-card device 100, such as access control circuitry and integrated memory, e.g., for authenticating a user to storage device 200, storing and managing one or more encryption and/or decryption keys, such as AES keys, private keys, etc. Although the term "smart-card" device may be used herein to describe all of the components shown in the smart-card device 205 of FIG. 2, it will be understood that various components may be omitted without preventing the smart-card device 205 from functioning as a smart-card device.

Storage device 200 may include a separate controller 210, such as a memory controller, e.g., a flash memory controller, through which signals are coupled between an access port 212 and the smart-card device 205. In one embodiment, the smart-card device 205 and the controller 210 may be integrated separately on separate chips disposed on a circuit board.

In the storage device 200 embodiment shown in FIG. 2, the controller 210 includes a security engine 215, such as cryptography engine, e.g., an AES cryptography engine. The controller 210 may include space management sector system 220 to manage the address space of a non-volatile memory device 250 with which the controller 210 is connected, and it may include an error correction engine 225, for correcting any data retention errors that may be present in data read from the memory device 250. In one embodiment, the memory device 250 is integrated separately on a separate chip from the smart-card device 205 and the controller 210, although the memory device 250, smart-card device 205 and controller 210 are packaged together in, for example, a package similar to a USB flash drive or a credit card. The nature of the access port 212 will depend upon the nature of the other device with which it is used. The access port 212 may be an electronic port, such as a USB connector, a magnetic signal port, such as the type commonly used in access control cards, an optical port, a wireless port, or any other type of port that can allow communication between the storage device 200 and another device.

The non-volatile memory device 250 may be a flash memory device, e.g., a NAND flash memory device, and it is connected to the controller 210 via an input/output interface 252, such as a flash memory interface. The input/output interface 252 may include a combined command/address bus, and a bi-directional data bus, as is typical for flash memory devices. The interface 252 may, of course, use other types of communications links, such as a high-speed link with one or more lanes through which all signals are coupled, or a more conventional memory device bus system including a command bus through which memory commands are coupled from the controller 210 to the memory device 250, an address bus through which addresses are coupled from the controller 210 to the memory device 250, and a data bus over which write data are transmitted from the controller 210 to the memory device 250 and read data are received by the controller 210 from the memory device 250.

The memory device 250 may be divided into a plurality of partitions, such as a private data partition 254, which may or may not be accessible to a user, and a user data partition 256, which is accessible to the user. In one embodiment, the private data partition 254 may include a firmware partition 258 that contains firmware for controlling operations on a memory array of the memory device 250 in response to control and address signals from the controller 210. In another embodiment, the private data portion 254 may include an applications partition 268 that stores smart-card applications, such as electronic transaction applications, electronic banking applications, telephone applications, etc., that might otherwise be stored in the non-volatile memory 115 of the smart-card device 205. Storing smart-card applications in the memory device 250 instead of in the non-volatile memory 115 facilitates a reduction of the memory requirements of the non-volatile memory 115 and thus the size of the non-volatile memory 115 that would otherwise be required when these applications are stored in the smart-card device 205. In addition, storing smart-card applications in the memory device 250 enables the storage of larger and more sophisticated smart-card applications and the storage of a larger number of applications compared to when smart-card applications are stored in the non-volatile memory 115 of the smart-card device 205. In one embodiment, the applications may be stored in the memory device 250 during fabrication of the memory device 250. In another embodiment, the applications data and/or other data may be encrypted before they are stored in the memory device 250. For this reason, the user data partition 256 may be partitioned into an encrypted data partition 262 storing data in encrypted form, and a unencrypted data partition 264 storing data in unencrypted form.

During operation, the cryptography engine 126 of the smart-card device 205 may be used for user authentication. Critical Security Parameter's ("CSP's"), such as encryption and/or decryption keys for use by the security engine 215, may be stored in the memory device 115 of the smart-card device 205. Alternatively, the processor 110 may run an application that generates CSP's, either by itself or based on CSP's stored in the memory device 115 or the key management system 135. The CSP's may also be a type of security information other than an encryption and/or decryption key, such as a password or certificate. If the CSP's are encryption and/or decryption keys, they may be either symmetric keys in which the same key is used for both encryption and decryption, or they may be asymmetric keys, in which different keys are used for encryption and decryption. The controller 210 may receive one or more of the CSP's from the smart-card device 205 for use by the security engine 215. The CSP's may be transferred to the controller 210 in a protected manner, as described in greater detail below, so the CSP's cannot be ascertained by someone obtaining access to internal communications paths in the storage device 200.

According to one embodiment, the storage device 200 may be in communication with a host 260. The host 260 may be, for example, a personal computer. Alternatively, the host 260 may be a card reader or some other device that is in communication with a personal computer or other device. An identifier, such as a user PIN or password, may be input to the host 260, and the host may transmit the identifier to the smart-card device 205 for verification to authenticate the user. The smart-card device 205 may then transmit a verification signal to the host 260 indicating whether or not the identifier is correct and thus whether or not the user is authenticated. In one embodiment, the storage device 200 may be operated with controller 210 in the bypass mode so that data can be stored in the memory device 250 without requiring authentication of the user. In another embodiment, there are different levels of authentication, such as a user and an administrator. An administrator enters his or her identifier, and is allowed access all of the functions in the storage device 200. A user enters his or her identifier, and is allowed access to a more limited set of functions in the storage device 200. In response to recognizing an administrator identifier, the smart-card device 205 may transmit one type of verification signal to the host 260. In response to recognizing a user identifier, the smart-card device 205 may transmit another type of verification signal to the host 260. Regardless of how the host 260 operates with the controller 210, the 210 is configured so that it will not allow commands from the host 260 to retrieve CSP's from the smart-card device 205. Any such commands sent by the host 260 to the smart-card device 205 will be intercepted by the controller 210 and blocked from reaching the smart-card device 205. Instead, the controller 210 will send an unsuccessful or failed status back to the host 260. In general, CSP's are not permitted to leave the storage device 200. In fact, particularly secure CSP's, such as private keys, may not even be permitted to leave the smart-card device 205. As a result, any function requiring the use of the private key will be executed by the processor 110 in the smart-card device 205.

In one embodiment, the controller 210 monitors the transmissions between the host 260 and the smart-card device 205 and detects whether or not the identifier coupled through the controller 210 to the smart-card device 205 is correct and thus whether or not the user is authenticated. After the authentication, the smart-card device 205 may send the CSP stored in the smart-card device 205 to the controller 210. If the smart-card device 205 has not accepted the identifier, it may be inhibited from sending the CSP to the controller 210. In another embodiment, the smart-card device 205 does not send the CSP to the controller 210 until the controller 210 requests it. In such case, the controller 210 may detect the verification signal from the smart-card device 205 and then send the request to the smart-card device 205. In response, the smart-card device 205 will send the CSP, such as an encryption and/or decryption key, to the controller 210. However, the smart-card device 205 will send the CSP to the controller 210 in response to the request only if it has determined that a user has been authenticated. As a result, someone cannot obtain the CSP's by injecting a request for the CSP's on the connections between the smart-card device 205 and the controller 210 since the smart-card device will not provide the CSP's. As explained in greater detail below, the security engine 215 in the controller 210 will then use the CSP for a security function. If the storage device 200 is configured to allow different levels of access, the controller 210 may detect different types of verification signals as they are transmitted by the smart-card device 205 to the host 260. The controller 210 then enables functions corresponding to the level of access granted.

If the CSP is an encryption key, the security engine 215 may be a cryptography engine that will encrypt data received from through the access port 212 and stored in the memory device 250. The data will then be stored in the memory device 250, such as in the encrypted data partition 264 of the memory device 250. In such case, the cryptography engine that will also receive from the smart-card device 205 a decryption key that it will use to decrypt data read the memory device 250 so that the date will be output from the access port 212 in unencrypted form. The security engine 215 thus performs encryption and/or decryption using the one or more encryption and/or decryption keys from the smart-card device 205 independently of the cryptography engine 126 in the smart-card device 205.

The CSP's sent from smart-card device 205 to controller 210 may be sent to the controller 210 in unencrypted form. However, doing so may make them discoverable by probing the connections between the smart-card device 205 and the controller 210. To prevent this from occurring, the CSP's may be encrypted by the cryptography engine 126 in the smart-card device 205 using a key from the key management system 135 before they are sent to the controller 210. The security engine 215 in the controller 210 can then use a key internally stored in the controller 210 to decrypt the encrypted key to obtain an unencrypted key that the security engine 215 will use to encrypt data transmitted to the memory device 250 and/or decrypt data received from the memory device 250. As a result, the unencrypted key will be undiscoverable even if someone obtains access to the connections between the smart-card device 205 and the controller 210.

In some embodiments, the processor 110 in the smart-card device 205 may run the smart-card applications stored in the applications partition 268 or elsewhere in the memory device 250. The applications may be stored in the memory device 250 in either encrypted or unencrypted form. If the applications are to be stored in encrypted form, they may be decrypted by the security engine 215 in the controller 210 using a key received from the smart-card device 205 in a protected manner, such as when a user's password is determined to be correct. The controller 210 then transmits the unencrypted applications to the smart-card device 205 for storage in the RAM 120 from where they are executed by the processor 110. In another embodiment, the controller 210 may be operated in the bypass mode, which places smart-card device 205 in direct communication with memory device 250, so that the processor 110 in the smart-card device 205 can run one or more smart-card applications 260 directly from the memory device 250.

In another embodiment, private data, such as smart-card applications stored in the applications partition 268 and/or updates to firmware stored in the firmware partition 258, may be downloaded from the host 260 when the host 260 is in communication with the Internet, for example. The private data may include an identifier, such as a password, digest or signed digest, that is authenticated at the smart-card device 205. For example, the host 260 may transmit the identifier for the private data to the smart-card device 205, and the smart-card device 205 may determine whether or not the identifier is correct.

In another embodiment, the storage device 200 stores a private key that is used to authenticate the sender of an e-mail. The sender uses a personal computer acting as the host 260 for the storage device 200 to draft an e-mail, and the personal computer generates a "digest," which is a relatively small set of bits that are unique to the specific text in the e-mail. For example, the digest may be a 16-bit word. The sender's private key is stored in either the non-volatile memory 115 or key management system 135 of the smart-card device 205 of the storage device 200. Less desirably, the private key may be stored in the memory device 250 in encrypted form. The storage device 200 is connected to the personal computer (host 260), such as by plugging the storage device 200 into a USB port of the personal computer. The smart-card device 205 then authenticates the user and sends the digest to the smart-card device 205. The processor 110 uses the key stored in the memory device 115 or the key management system 135 to encrypt the digest to generate an encrypted digest, or signature. If the private key was stored in the memory device 250 in encrypted form, the controller 210 reads the encrypted private key from the encrypted data partition 262 of the memory device 250, and sends it to the smart-card device 205 where it is decrypted and used by the processor 110 to generate a signature. the security engine 215 may use the decrypted the private key to obtain the unencrypted private key. Regardless of how the signature is generated, it is then sent back to the personal computer 260 and is embedded in the e-mail sent by the personal computer.

When the e-mail is received by a recipient, the recipient may need to verify that the e-mail was actually sent by the person who purportedly send it. The recipient's personal computer obtains the sender's public key, such as from a directory or from the e-mail itself if the sender included it, and uses the public key to decrypt the signature received with the e-mail to obtain the digest of the e-mail. The recipient's personal computer also generates a digest from the received e-mail and compares it to the digest obtained from the signature. If the digests match, the identity of the sender has been verified. If the e-mail was sent by an imposter, the digest generated from the signature will not match the digest generated from the e-mail.

In another embodiment, the controller 210 may permit access to different partitions in the memory device depending on the level of access it grants. For example, an administrator may be permitted to read from and write to the applications partition 268 as well as both user data partitions 256, while a user may be permitted to access only the user data partitions 256.

In some embodiments, the CSP's that the controller 210 receives from the smart-card device 205 may be "session keys," which are encryption and/or decryption keys that change each time the storage device 200 is used or according to some other schedule. The processor 110 in the smart-card device 205 may run an application to generate the session keys. In another embodiment, the controller 210 generates each session key, which is used by the security engine 215.

Figure 3:
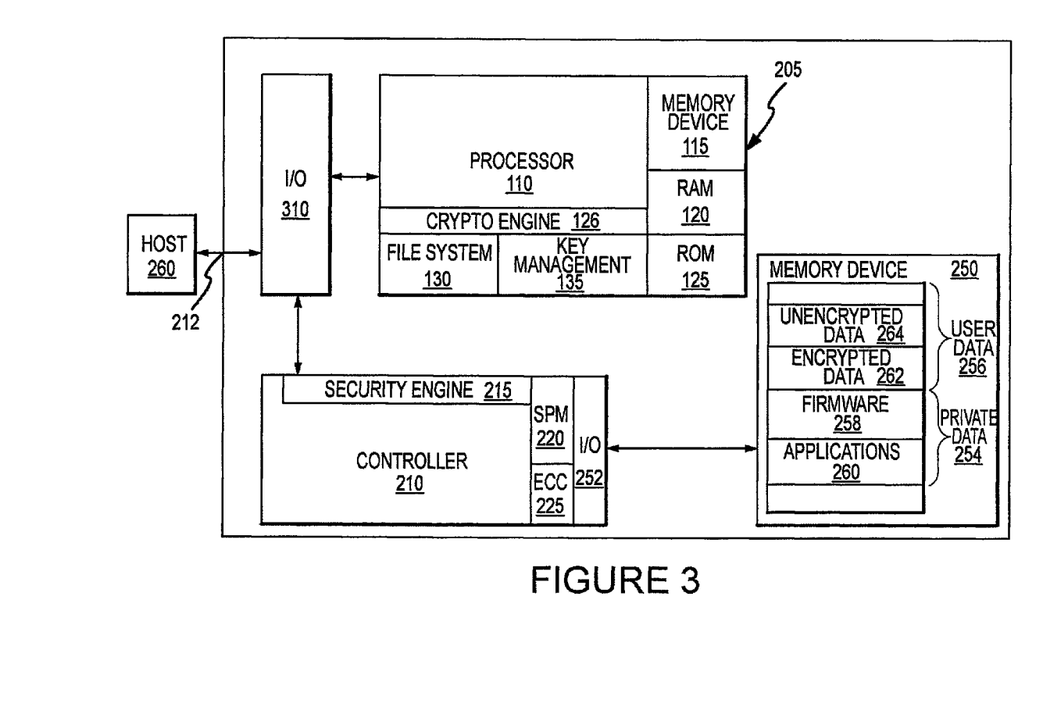
FIG. 3 is a block diagram of a storage device according to another embodiment of the invention in which an integrated smart-card device and a controller that is connected to a memory device are connected to each other and an access port through an input/output interface.

Another embodiment of a storage device 300 is shown in FIG. 3. Many of the components used in the storage device 300 are the same or substantially the same as components are used in the smart-card device 200 shown in FIG. 2. Therefore, in the interest of brevity, an explanation of these components will not be repeated, and the same reference numerals will be used in FIG. 3. The storage device 300 differs from the storage device 200 by using an input/output ("I/O") interface 310 to couple the access port 212 to both the smart-card device 205 and the controller 210 instead of using the controller 210 to couple the access port 212 to the smart-card device 205. The I/O interface 310 is used to route signals between the Smart-Card device 205 and the access port 212 in the same manner that the I/O interface 127 in the storage device 100 of FIG. 1 is used. The I/O interface 310 is also used to couple the CSP's from the smart-card device 205 to the controller 210, and it may also perform other functions that the controller 210 in the storage device 200 of FIG. 2 performed based on monitoring signals transmitted between the smart-card device 205 and the access port 212. For example, the I/O interface 310 may monitor and couple to the controller 210 identifiers transmitted from the access port 212 to the smart-card device 205, as explained above. The I/O interface 310 may also couple to the controller 210 the verification signals generated by the smart-card device 205 as also explained above. The I/O interface 310 will then route the resulting CSP requests from the controller 210 to the smart-card device 205. In other embodiments, the I/O interface 310 will apply appropriate signals to the controller 210 corresponding to specific signals it monitors and detects being sent to or from the smart-card device 205. For example, rather that passing on to the controller 210 verification signals received from the smart-card device 205, it may generate and send signals to the controller 210 corresponding to the verification signals.

From the foregoing it will be appreciated that, although specific embodiments of the invention have been described herein for purposes of illustration, various modifications may be made without deviating from the spirit and scope of the invention. For example, the term "smart-card device" may include a device containing all of the components in the smart-card device 205. However, various components may be omitted from a device without preventing the device from being considered a smart-card device. For example, the RAM 120 and the ROM 125 may be omitted, and the data that would normally be stored in both the RAM 120 and the ROM 125 may be stored in the memory device 115. Additionally, the file system 130, key management system 135 and cryptography engine 126 may be omitted. A smart-card device will generally have some type of processor, which need not be a full-features processor such as a microprocessor. A reduced capability processor, such as a controller, may be used in some embodiments. A smart-card device will generally also have some type of non-volatile storage, such as the memory device 115. However, the storage need not be separate from the processor 110 and may, in some embodiments, be integrated in the processor 110. Accordingly, the invention is not limited except as by the appended claims.

What is claimed is:

1. A storage device, comprising:
   a first device configured to output a critical security parameter, the first device comprising:
      a cryptography engine configured to encrypt the critical security parameter; and
      a first non-volatile memory device integrated with the cryptography engine;
   a controller packaged with the first device wherein the controller is configured to decrypt the critical security parameter; and
   a second non-volatile memory device packaged with the first device and the controller, the second non-volatile memory device configured to receive data and store the received data the second non-volatile memory device further configured to protect the stored data using the security parameter,
   wherein the first device corresponds to a first chip and the second non-volatile memory device corresponds to a second chip.

2. The storage device of claim 1, wherein the first device is configured to provide the critical security parameter to the controller responsive, at least in part, to authentication of a host.

3. The storage device of claim 1, wherein the second non-volatile memory device comprises first and second partitions, wherein the first partition is configured to store user data and the second partition is configured to store private data.

4. The storage device of claim 3, wherein the first partition comprises an unencrypted partition and an encrypted partition, wherein the unencrypted partition is configured to store unencrypted data and the encrypted partition is configured to store encrypted data.

5. The storage device of claim 1, wherein the first device is configured to provide a verification signal to the controller indicative of whether an identifier is correct.

6. The storage device of claim 1, wherein the first device is configured to generate the critical security parameter.

7. The storage device of claim 1, wherein the critical security parameter comprises at least one of an encryption key or a decryption key.

8. A storage device, comprising:
a first device corresponding to a first chip and configured to provide a critical security parameter;
a controller coupled to the first device and configured to receive the critical security parameter;
a memory device packaged with the first device and corresponding to a second chip, the memory device coupled to the controller and configured to provide an encrypted application to the controller,
wherein the controller is configured to decrypt the application using the critical security parameter and provide an unencrypted application to the first device, the first device configured to execute the unencrypted application.

9. The storage device of claim 8, wherein the first device is configured to provide the critical security parameter in a protected manner.

10. The storage device of claim 9, wherein the controller is configured to decrypt the protected critical security parameter.

11. The storage device of claim 8, wherein the first device and the memory device are configured to Operate in a bypass mode.

12. The storage device of claim 8, wherein the first device is configured to provide the critical security parameter responsive, at least in part, to verifying an identifier.

13. The storage device of claim 12, wherein the first device is configured to assign an access level to host responsive, at least in part, to verifying the identifier.

14. A method, comprising:
providing a critical security parameter from a first memory device to a controller, wherein the first memory device includes a cryptography engine, wherein the cryptography engine is configured to encrypt the critical security parameter;
providing data to the controller from a second memory device, wherein the controller and the second memory device are packaged with the first memory device;
decrypting the data using the critical security parameter with a security engine included in the controller;
providing the decrypted data to an access port;
wherein the first memory device and the second memory device correspond to first and second chips, respectively.

15. The method of claim 14, wherein the data is a first set of data, the method further comprising:
receiving a second set of data from the access port;
encrypting the second set of data using the critical security parameter; and
providing the encrypted second set of data to the memory device.

16. The method of claim 14, further comprising:
before said providing a critical security parameter, validating an identifier.

17. The method of claim 14, wherein the memory device comprises an encrypted partition configured to store data encrypted with the critical security parameter.

18. The method of claim 14, further comprising:
executing an application on the first device.

19. The method of claim 14, wherein the decrypted data comprises a digest.

20. The method of claim 14, wherein the critical security parameter is generated by the first device.

* * * * *

UNITED STATES PATENT AND TRADEMARK OFFICE
CERTIFICATE OF CORRECTION

PATENT NO.        : 8,930,711 B2
APPLICATION NO.   : 13/437613
DATED             : January 6, 2015
INVENTOR(S)       : Mehdi Asnaashari et al.

It is certified that error appears in the above-identified patent and that said Letters Patent is hereby corrected as shown below:

In the Claims

In column 9, line 33, in Claim 11, delete "Operate" and insert -- operate --, therefor.

In column 10, line 14, in Claim 14, after "controller;" insert -- and --.

Signed and Sealed this
Twenty-fourth Day of March, 2015

Michelle K. Lee
*Director of the United States Patent and Trademark Office*